(12) United States Patent
O'Connor et al.

(10) Patent No.: US 8,533,395 B2
(45) Date of Patent: Sep. 10, 2013

(54) MOVEABLE LOCKED LINES IN A MULTI-LEVEL CACHE

(75) Inventors: Dennis M. O'Connor, Chandler, AZ (US); Michael W. Morrow, Cary, NC (US); Stephen J. Strazdus, Harvard, MA (US)

(73) Assignee: Micron Technology, Inc., Boise, ID (US)

( * ) Notice: Subject to any disclaimer, the term of this patent is extended or adjusted under 35 U.S.C. 154(b) by 1237 days.

(21) Appl. No.: 11/361,228

(22) Filed: Feb. 24, 2006

(65) Prior Publication Data
US 2007/0204121 A1 Aug. 30, 2007

(51) Int. Cl.
*G06F 12/14* (2006.01)
(52) U.S. Cl.
USPC ........... 711/122; 711/133; 711/162; 711/118; 711/E12.075; 711/E12.077
(58) Field of Classification Search
USPC .................. 711/163, 122, 133, 118, E12.075, 711/E12.077
See application file for complete search history.

(56) References Cited

U.S. PATENT DOCUMENTS

| | | | | |
|---|---|---|---|---|
| 5,410,697 A * | 4/1995 | Baird et al. | ................... | 711/152 |
| 5,678,026 A * | 10/1997 | Vartti et al. | ................... | 711/152 |
| 5,983,335 A * | 11/1999 | Dwyer, III | ....................... | 712/23 |
| 6,338,124 B1 * | 1/2002 | Arimilli et al. | ................ | 711/144 |
| 6,792,497 B1 * | 9/2004 | Gold et al. | .................... | 710/317 |
| 6,986,003 B1 * | 1/2006 | Sipple et al. | .................. | 711/145 |
| 7,024,521 B2 * | 4/2006 | Glasco | .......................... | 711/145 |
| 7,290,081 B2 * | 10/2007 | Parthasarathy et al. | ....... | 711/102 |
| 2004/0254943 A1 * | 12/2004 | Malcolm | ...................... | 707/100 |
| 2005/0251626 A1 * | 11/2005 | Glasco | .......................... | 711/133 |
| 2006/0036811 A1 * | 2/2006 | Dieffenderfer et al. | ....... | 711/136 |
| 2006/0129691 A1 * | 6/2006 | Coffee et al. | ................ | 709/230 |
| 2006/0190769 A1 * | 8/2006 | Doddapaneni et al. | ......... | 714/38 |

* cited by examiner

*Primary Examiner* — Mardochee Chery
(74) *Attorney, Agent, or Firm* — Schwegman, Lundberg & Woessner, P.A.

(57) ABSTRACT

A processor includes a multi-level cache hierarchy where a lock property is associated with a cache line. The cache line retains the lock property and may move back and forth within the cache hierarchy. The cache line may be evicted from the cache hierarchy after the lock property is removed.

22 Claims, 2 Drawing Sheets

MOVEABLE LOCKED LINES IN A MULTI-LEVEL CACHE

Digital processors include cache memories for storing data and instructions that are faster static memories as compared to the slower dynamic memories used for the main memory. Through use of replacement algorithms and cache hierarchy, cache data may be moved and controlled to provide a relatively high hit rate. Improvements are needed in cache memory to speed up the flow of instructions and data to the execution unit of the processor.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
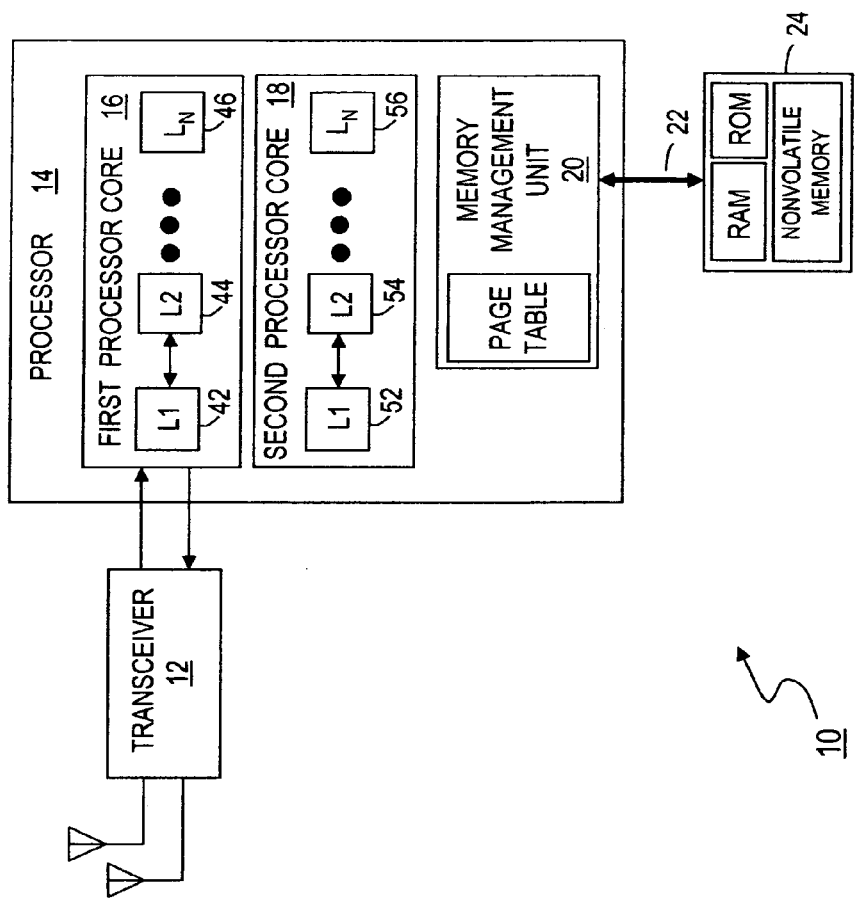
FIG. 1 illustrates a processor in a wireless device that incorporates lock properties stored with cache information that is used in replacement decisions in accordance with the present invention.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

As shown in FIG. 1, wireless communications device 10 includes a radio to allow communication in an RF/location space with other devices. Accordingly, communications device 10 may operate in a wireless network such as, for example, a cellular network, a Personal Area Network (PAN), a Wireless Personal Area Network (WPAN), an Ultra-Wideband (UWB) network, a Piconet or a combination thereof. The figure illustrates a transceiver 12 that both receives and transmits a modulated signal from one or more antenna. Analog front end transceiver 12 may be a stand-alone Radio Frequency (RF) integrated analog circuit, or alternatively, be embedded with a processor 14 as a mixed-mode integrated circuit. The received modulated signal may be frequency down-converted, filtered, and then converted to a baseband, digital signal.

Processor 14 may include baseband and applications processing functions and utilize one or more processor cores. Processor 14, in general, processes functions that fetch instructions, generate decodes, find operands, and perform appropriate actions, then stores results. The use of multiple cores 16 and 18 may allow one core to be dedicated to handle application specific functions and allow processing workloads to be shared across the cores.

A memory management unit 20 includes a hardware/software interface between a host controller software driver and the host controller hardware that exchanges data across memory interface 22 with external system memory 24. System memory 24 may include a combination of memories such as a Random Access Memory (RAM), a Read Only Memory (ROM) and a nonvolatile memory, although neither the type nor variety of memories included in the system memory is a limitation of the present invention.

As illustrated in FIG. 1, processor 14 stores cache information in a multi-level cache memory hierarchy, and as such, processor cores 16 and 18 may include a first or inner cache, a second or outer cache, etc. More particularly and as illustrated in the diagram, processor core 16 may include a first or inner cache 42 that is labeled L1, a second or outer cache 44 that is labeled L2 and a final cache 46 that is labeled $L_N$. Similarly, processor core 18 may include a first or inner cache 52 that is labeled in the figure as L1, a second or outer cache 54 that is labeled as L2 and a final cache 56 that is labeled as $L_N$. Additional levels of cache may also exist, shared between the processors. The invention applies to caches dedicated to each processor, to caches that may be shared between the processors, and further to caches that may also be used by other components in the system.

When processor 14 reads or writes a location in system memory 24, the processor generally operates by checking the smallest level cache first, i.e., the L1 cache, to determine whether the memory location is in the inner cache as indicated by a cache hit. If the memory location is not in the smallest level or inner cache of the multi-level cache, then a cache miss occurs and the next larger cache in the cache hierarchy is checked before the processor finally checks system memory 24.

The cache memory hierarchy illustrated by the L1, L2, . . . , $L_N$ levels provides time savings in operations executed by processor cores 16 and 18. Based on the hierarchy, if the processor core finds the data for its next operation in the L1 cache then time is saved compared to having to retrieve that stored data from the next level in the hierarchy. Thus, the hierarchy allows cache memory data to be accessed more quickly from L1 cache than the larger L2, . . . , $L_N$ cache memories or the main system memory 24.

A cache tracks the memory locations that have been modified since being loaded into the cache, especially when those modifications have not been propagated to other levels in the cache hierarchy. These memory locations are marked "dirty" and the data in these locations is written back to main memory 24 when that data is evicted from the cache. Cache lines may also be evicted from a first level of the cache memory hierarchy to a second level of the cache memory hierarchy. In accordance with the present invention, properties may be attached to a cache line that dictate actions during an eviction of the cache line within the multi-level cache hierarchy. In accordance with the present invention, one property attached to the cache line is a lock indication bit.

In one embodiment the lock indication bit may be a stored bit in a data field that accompanies the data associated with the cache line. The lock indication bit may be stored in the cache line's TAG which contains the index of the datum in main memory which has been cached, or alternatively, the lock indication bit may be stored separately in the cache line. In another embodiment, the lock indication property may be expressed indirectly by a particular state value that the cache maintains within a set or on a per set basis. The lock indication bit may also be a bit in a register that when set marks the cache line. Neither the number of bits nor the method of "locking" the cache line are limitations of the present invention.

In general, a lock condition may be determined by the Operating System (OS) or by an application running in processor 14 that apply to data or instructions that have been identified as performance-critical. Cache locking may optimize processor performance by holding the identified data and instructions within the multi-level cache memory hierarchy, thus keeping the data and instructions always present for executing algorithms and applications. Thus, when data or an instruction is designated via a sequence of commands to the system as "locked", the locked items are maintained within the cache hierarchy or at some set of levels within the cache hierarchy.

Note that the term "locked" does not confine the items to a particular cache, but rather, locked items may migrate from one cache level to another cache level and back again in response to changing execution demands. This may include migration from a cache dedicated to one processor to a cache dedicated to another processor and migration to or from a shared cache. Further note that the term "locked" does ensure that the locked item is confined to some level of the cache hierarchy, and thus guarantees some minimum level of access performance for the locked items.

Figure 2:
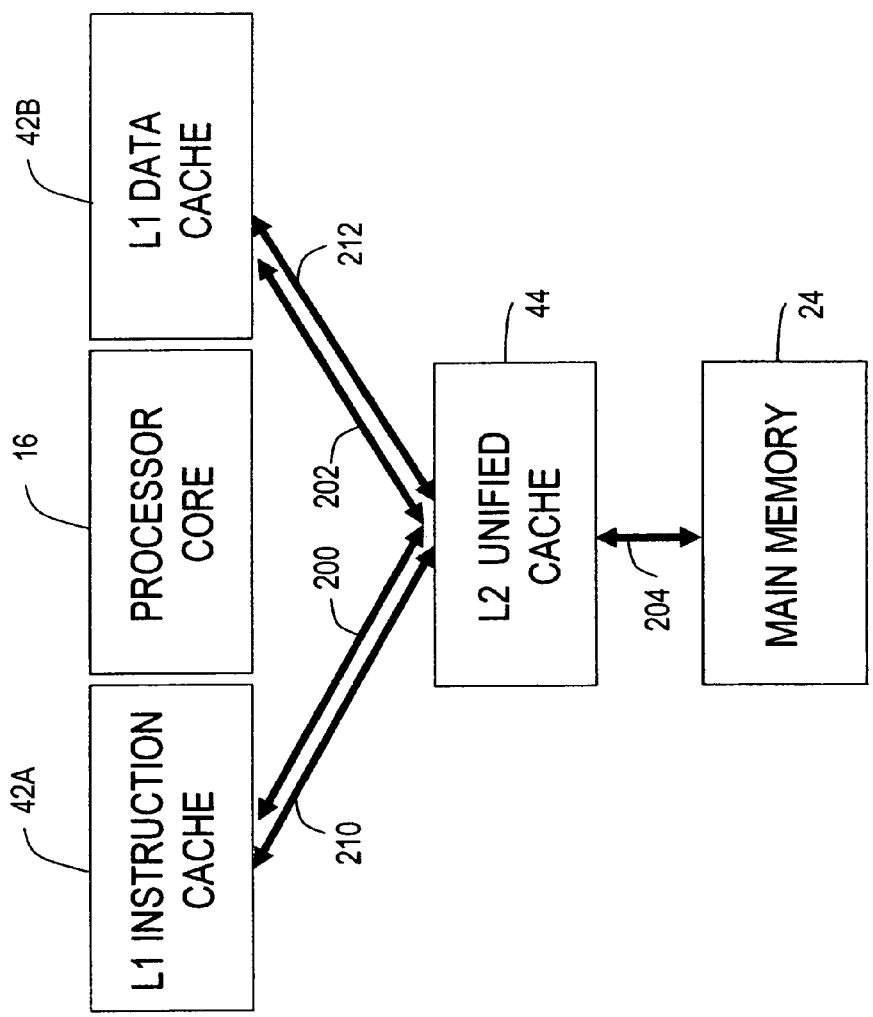
FIG. 2 illustrates locked and unlocked cache lines that migrate through the cache hierarchy.

FIG. 2 illustrates a processor core such, for example, processor core 16 (see FIG. 1) that is shown interacting with a first level instruction cache 42A, a first level data cache 42B, a second level unified cache 44 and a main memory 24. Although this embodiment is shown with a cache configuration that includes an L1 instruction cache, an L1 data cache and a unified L2 cache, it should be understood that the present invention is not limited to this cache configuration. In other words, other embodiments would include a second level having an instruction cache separate from the data cache, or any combination of separated instruction and data caches and unified cache in the various levels of the cache hierarchy. Further, the embodiment in the figure depicts two levels of cache hierarchy for simplicity of illustration. However, it should be understood that the features of the present invention that allow locked lines to move between the various levels of cache extended beyond two levels of cache hierarchy.

The cache in cooperation with processor core 16 shows unlocked lines that may migrate between the L1 instruction cache 42A and the L2 unified cache 44 that are indicated in the figure as lines 200. Similarly, the unlocked lines that may migrate between the L1 data cache 42B and the L2 unified cache 44 are indicated in the figure as lines 202. And finally, the unlocked lines that may migrate between the L2 unified cache 44 and the main memory 24 are indicated in the figure as lines 204. The unlocked lines may move back and forth between all levels of the memory hierarchy in accordance with the cache system's replacement policy.

FIG. 2 also shows the locked lines 210 that may migrate between the L1 instruction cache 42A and the L2 unified cache 44 and the locked lines 212 that may migrate between the L1 data cache 42B and the L2 unified cache 44. The embodiment illustrates that locked lines may move back and forth between the L2 and the L1 caches according to the cache system's replacement policy. Note that irrespective of the direction of travel, whether from an inner cache to an outer cache or from the outer cache to the inner cache, that cache line still retains the lock indication property in accordance with the present invention.

The cache line is not locked into any particular level of the cache, but rather, the cache line may be moved or copied from one cache to another and the "lock" bit associated with that particular cache line moves with the cache line. Thus, a "lock" bit may be set for a cache line and the locked cache line, once fetched from memory, is not evicted from the L2 cache, for example, back to main memory 24 unless the cache first receives a command to unlock that particular cache line. In accordance with features of the present invention, the "lock" bit associated with the cache line assures that the locked cache line is in either, or both, of the L1 or L2 cache which provides some minimum level of access performance for the locked items.

In one embodiment the multi-level caches allow the data in the L1 cache to also be in the L2 cache, a condition called inclusive. In an inclusive L1 cache a line may reside in both the L1 cache and the L2 cache and lines are not moved from the L1 cache back to the L2 cache, and locked lines sent to the L1 cache would still be retained in the L2 cache. In another embodiment processor 16 may have exclusive caches where data is guaranteed to be in at most one of the L1 and L2 caches.

A cache line that is evicted from an inner cache to the next or outward level of the cache hierarchy and deemed performance-critical is marked with the lock indication property. Note that the lock indication property may or may not accompany a cache line being filled from the outer level cache to an inner cache in accordance with the present invention. This is because a cache line in an inner cache is not a candidate to be evicted to the main memory. However, the "lock" bit would be set when that performance-critical cache line is evicted from the inner cache to the outer most level of the cache hierarchy.

Thus, in one instantiation, the lock property would be sent to the inner cache and stored with the cache line so that the lock property could be sent back to the outer level cache when that line was evicted from the inner cache, but the lock property would not be used by the inner cache. Alternatively, a separate mechanism such as a table look-up (not shown) or range check may be invoked on eviction of the line from an inner cache to the outer-most cache to determine whether a line should have the lock property set.

In caches where the outer levels of the cache hierarchy are protected by Error Correcting Code (ECC) and the inner levels are not protected, the present invention removes the need to do sub-line read-modify-writes on lines in the outer level of the hierarchy since lines are free to move into the inner level of the cache for such operations. This greatly simplifies the control logic and data flow in the outer level of the cache. In such caches the migration of locked lines from parity-protected inner caches to ECC-protected outer caches may be used to scrub the cache for soft errors.

By now it should be apparent that the present invention enhances processor performance by simplifying the cache replacement logic for multi-level caches. The various embodiments of the present invention allow the lock indication property to remain associated and travel with the cache line within the multi-level cache hierarchy. At each level of the cache hierarchy, the lock indication property makes the cache line a protected line that is prevented from being overwritten when space for new data is needed in the cache. The present invention may simplify cache locking since neither the OS nor the application separately manages the lockable capacity of each cache level. System performance of the processor may be improved by allowing the hardware to move locked lines into the faster and usually smaller L1 caches when necessary while still having the larger lockable capacity of the L2 cache.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A method, comprising:
locking a cache line into a multi-level cache hierarchy including a first level cache and a second level cache, the locking including attaching a lock indication property to a cache line tag associated with the cache line responsive to identifying that the cache line moves from the first level cache to the second level cache, the attaching including setting the lock indication property to indicate that the cache line is unavailable for eviction from the multi-level cache hierarchy upon a cache miss, the cache line tag configured to move with the cache line;
moving the lock indication property attached to the cache line tag from the second level cache to another level cache including the first level cache responsive to identifying that the cache line moves from the second level cache to the other level cache; and
transferring the lock indication property associated with the cache line from the first level cache to the second level cache responsive to an eviction of the cache line from the first level cache to the second level cache.

2. The method of claim 1, further comprising:
using, at each level cache of the multi-level cache hierarchy, the lock indication property to protect the cache line from being overwritten when space for new data is needed.

3. The method of claim 1, further comprising:
refraining from restricting the locked cache line to a particular level in the multi-level cache hierarchy.

4. The method of claim 1, further comprising:
copying the cache line to another cache; and
moving the lock indication property associated with the cache line to the another cache.

5. The method of claim 1, wherein the locking the cache line further includes refraining from evicting the cache line back to a main memory unless a cache controller first receives a command to unlock the cache line.

6. The method of claim 1, wherein the locking the cache line further includes assuring that the locked cache line is in an inner cache, an outer cache, or both.

7. A method comprising:
locking a cache line into a multi-level cache hierarchy including a first level cache and a second level cache without fixing the first line into a particular location of the multi-level cache hierarchy, the locking including attaching a lock indication property to a cache line tag associated with the cache line responsive to identifying that the cache line moves from the first level cache to the second level cache, the attaching including setting the lock indication property to indicate that the cache line is unavailable for eviction from the multi-level cache hierarchy upon a cache miss;
moving the lock indication property attached to the cache line tag from the second level cache to another level cache including the first level cache responsive to identifying the cache line moving from the second level cache to the other level cache; and
transferring the lock indication property associated with the cache line from the first level cache to the second level cache responsive to an eviction of the cache line from the first level cache to the second level cache.

8. The method of claim 7, wherein the locking the cache line further includes guaranteeing the cache line is in at least one cache within the multi-level cache hierarchy.

9. The method of claim 7, wherein the locking the cache line further includes refraining from specifying a particular cache in the multi-level cache hierarchy or a particular line in a corresponding one of the multi-level cache hierarchy.

10. The method of claim 7, wherein the lock indication property comprises information indicating that the cache line is not a preferred cache line for replacement if memory space is needed for new cache data.

11. A method comprising:
evicting a cache line from a first level cache of a cache memory hierarchy to a second level cache of the cache memory hierarchy; and
transferring a lock property that is part of a cache line tag associated with the cache line from the first level cache to the second level cache responsive to the evicting of the cache line from the first level cache to the second level cache, the lock property being attached to the cache line tag associated with the cache line responsive to the cache line moving to the first level cache from another level cache including the second level cache, the lock property indicating that the cache line is unavailable for eviction from the cache memory hierarchy upon a cache miss, wherein data in the cache line in the second level cache, when accessed, is not to be evicted to a main memory in accordance with the lock property transferred with the cache line.

12. The method of claim 11, wherein the second level cache is configured to examine the lock property as set for the cache line in the first level cache to determine whether to evict the cache line to the main memory.

13. A method comprising:
evicting a cache line from a first level cache of a cache memory hierarchy to a second level cache of the cache memory hierarchy;
evaluating the cache line evicted from the first level cache to determine a lock property, the lock property being part of a cache line tag associated with the cache line, the lock property being attached to the cache line tag associated with the cache line responsive to the cache line moving to the first level cache from another level cache including the second level cache, and the lock property indicating that the cache line is unavailable for eviction from the cache hierarchy upon a cache miss; and
transferring the lock property from the first level cache to the second level cache responsive to the evicting of the cache line from the first level cache to the second level cache, wherein data in the cache line in the second level cache, when accessed, is not to be evicted to a main memory in accordance with the lock property transferred with the cache line.

14. The method of claim 13, wherein the second level cache is configured to determine whether to evict the cache line to the main memory based on the lock property as set for the cache line in the first level cache.

15. A system including a multi-level cache hierarchy, comprising:
a processor to evict a cache line from a first level cache of the multi-level cache hierarchy to a second level cache of the multi-level cache hierarchy, the processor configured to transfer a lock property that is part of a cache line tag associated with the cache line from the first level cache to the second level cache responsive to the evicting of the cache line from the first level cache to the second level cache, the lock property being attached to the cache line tag associated with the cache line responsive to the cache line moving to the first level cache from another level cache including the second level cache, the lock property indicating that the cache line is unavailable for eviction from the multi-level cache hierarchy upon a cache miss.

16. The system of claim 15, wherein the processor includes two processor cores each having the multi-level cache hierarchy.

17. The system of claim 16, wherein caches in the multi-level cache hierarchy are shared between the two processor cores.

18. The system of claim 15, further comprising:
first and second antennas coupled to a transceiver to transfer signals with the processor.

19. The system of claim 15, wherein the second level cache comprises a unified cache.

20. A processor having a multi-level cache hierarchy comprising:
a first level data cache, wherein a first cache line of cache lines of the first level data cache has a first cache line tag associated with a first lock property;
a first level instruction cache, wherein a second cache line of cache lines of the first level instruction cache has a second cache line tag associated with a second lock property, the second lock property being attached to the second cache line tag responsive to the second cache line moving to the first level instruction cache from another level cache; and
an outer level cache configured to receive the first cache line or the second cache line evicted from a corresponding cache of the first level data cache or the first level instruction cache and to receive a corresponding lock property of the first lock property or the second lock property, wherein the first level cache, the second level cache and the outer level cache are shared between a plurality of processor cores associated with the multi-level cache hierarchy, wherein the corresponding lock property associated with the cache line evicted from the corresponding cache indicates that the cache line is unavailable for eviction from the multi-level cache hierarchy upon a cache miss, and wherein a decision on what action to take with the cache line is based on the corresponding lock property that is part of a corresponding one of the first cache line tag or the second cache line tag that remains attached to the cache line, and the outer level cache configured to receive the lock indication property associated with the first cache line of one of the first level data cache and the first level instruction cache responsive to an eviction of the first cache line of one of the first level data cache and the first level instruction cache to the outer level cache.

21. The processor of claim 20, wherein the outer level cache comprises a unified cache.

22. The processor of claim 20, wherein the plurality of processor cores comprises first and second processor cores each having the multi-level cache hierarchy.

* * * * *